(12) United States Patent
Tsou et al.

(10) Patent No.: US 6,875,813 B2
(45) Date of Patent: *Apr. 5, 2005

(54) ISOBUTYLENE-BASED ELASTOMER BLENDS

(75) Inventors: Andy H. Tsou, Houston, TX (US); Ilan Duvdevani, Houston, TX (US); Hsien-Chang Wang, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/258,008

(22) PCT Filed: Apr. 26, 2001

(86) PCT No.: PCT/US01/13588

§ 371 (c)(1),
(2), (4) Date: Apr. 16, 2003

(87) PCT Pub. No.: WO01/85837

PCT Pub. Date: Nov. 15, 2001

(65) Prior Publication Data

US 2004/0106735 A1 Jun. 3, 2004

Related U.S. Application Data

(60) Provisional application No. 60/203,329, filed on May 11, 2000, and provisional application No. 60/134,835, filed on May 19, 1999.

(51) Int. Cl.[7] ............... C08F 8/00; C08L 9/00; C08L 23/04; C08L 27/06; C08L 45/00
(52) U.S. Cl. ............ 525/191; 525/211; 525/216; 525/232; 525/235; 525/240; 525/241; 524/515; 524/525
(58) Field of Search ............... 525/191, 211, 525/216, 232, 235, 240, 241; 524/515, 525

(56) References Cited

U.S. PATENT DOCUMENTS

| | | | |
|---|---|---|---|
| 4,256,857 A | | 3/1981 | Buckler et al. ............ 525/331 |
| 4,948,840 A | * | 8/1990 | Berta ...................... 525/193 |
| 5,157,081 A | | 10/1992 | Puydak et al. ............ 525/237 |
| 5,162,409 A | | 11/1992 | Mroczkowski ............ 524/262 |
| 5,993,954 A | * | 11/1999 | Radovanovic et al. ... 428/315.5 |
| 6,100,334 A | * | 8/2000 | Abdou-Sabet ............ 525/191 |
| 6,326,433 B1 | | 12/2001 | Wang et al. .............. 525/191 |

FOREIGN PATENT DOCUMENTS

| | | |
|---|---|---|
| WO | 00/69930 | 11/2000 |
| WO | 00/69966 | 11/2000 |
| WO | 01/18141 A1 | 3/2001 |

OTHER PUBLICATIONS

Mirabella et al, Determination of the crystallinity of polyethylene/∝olefin copolymers by thermal analysis, Aug. 15, 2002, Journal of Polymer Science Part B: Polymer Physics, vol. 40, Iss. 15, pp 1637–1643.*

* cited by examiner

Primary Examiner—Nathan M. Nutter
(74) Attorney, Agent, or Firm—Kevin M. Faulkner; Leandro Arechederra

(57) ABSTRACT

The improved green strength, green elongation, and green relaxation properties of isobutylene-based elastomers at elevated temperatures along with improved aging and barrier properties are achieved by blending semi-compatible, semi-crystalline copolymers with the isobutylene elastomers. The semi-crystalline copolymers are typically copolymers of ethylene and an alpha-olefin having from 4 to 16 carbon atoms. The improved properties are maintained in subsequent rubber compounds containing said blends and are particularly useful in tire and pharmaceutical container applications.

24 Claims, No Drawings

ISOBUTYLENE-BASED ELASTOMER BLENDS

CROSS REFERENCE TO RELATED APPLICATIONS

This application is a national stage application of International Application No. PCT/US01/13588, filed Apr. 26, 2001 that claims the benefit of U.S. Provisional Application No. 60/203,329, filed May 11, 2000, and claims priority to U.S. Ser. No. 09/569,363, filed May 11, 2000, U.S. Pat. No. 6,326,433, that claims the benefit of U.S. Provisional Application No. 60/134,835, filed May 19, 1999.

FIELD OF INVENTION

This invention relates to isobutylene-based polymers, particularly halogenated isobutylene-based polymers, and more particularly to blends of semi-crystalline polymers with brominated butyl rubber having improved green (pre-cure) strength and improved impermeability, and methods for its preparation.

BACKGROUND OF THE INVENTION

Isobutylene-based polymers have been blended with numerous compounds such as natural rubber in order to improve its various properties, such as elasticity, strength, air impermeability, etc. Natural rubber (NR) is known to crystallize upon extension and is known to have very high molecular weight fractions, both of which help improve its green properties. The terms "green properties" and "green strength" are terms applied to denote the strength, cohesiveness and dimensional stability of rubber compounds before they are vulcanized or cured. Such properties are important in fabricating rubber articles from green compounds, particularly composites such as tires, but also can be important in extruded items such as innertubes and molded articles such as pharmaceutical stoppers. Isobutylene-based polymers are therefore blended with natural rubber when green properties need to be improved. However, green strength properties of isobutylene-based polymers are often adverse to those of natural rubber, particularly at elevated temperatures of up to 40 to 70° C. Addition of natural rubber reduces the barrier properties of isobutylene-based polymer/natural rubber blends significantly, which is undesirable for applications requiring low permeability to gases, such as in tires and in bladder applications. Heat stability of cured compounds is also diminished in natural rubber blends.

Isobutylene-based polymers, particularly halogenated isobutylene-based polymers, and more particularly brominated butyl rubber are the primary blends of most tire liners, heat resistant tubes, bladders and other commercially known products such as pharmaceutical ware. The term "butyl rubber" as employed herein is intended to refer to a vulcanizable rubbery copolymer containing, from 85 wt % to 99.5 wt % combined isoolefin derived units having from 4 to 8 carbon atoms. Such copolymers and their preparation are well known. See, e.g., RUBBER TECHNOLOGY 284–321 (Chapman & Hall 1995). Halogenated butyl rubber, particularly brominated butyl rubber, is also well known. It may be prepared by treating a solution of butyl rubber, in an organic solvent, with bromine and recovering the brominated butyl rubber by contacting it with steam and drying the resulting aqueous slurry.

Brominated butyl rubber typically contains less than one bromine atom per carbon-carbon double bond originally present in the polymer or from less than 3 wt % (weight percent) bromine. The Mooney viscosity of the halobutyl rubbers useful in the instant invention, measured at 125° C. (ML 1+8), range from 20 to 80, more preferably from 25 to 55, and most preferably from 30 to 50. It is a relatively chemically resistant, rubbery polymer which can be compounded and cured to produce synthetic rubber with an outstanding air impermeability, useful in making tire innerliners and innertubes.

Brominated butyl rubber has a greater degree of reactivity than butyl rubber, so that it can be blended with other unsaturated polymers and co-vulcanized therewith, which the unreactivity of butyl precludes. Brominated butyl rubber vulcanizates, however, show good air impermeability, heat aging characteristics and general chemical resistance. It finds one of its principal uses in the tubeless tire innerliners. Such liners are in effect thin sheets of rubber, adhered to the tire carcass by co-vulcanization with the rubbers comprising the tire carcass. The heat aging characteristics air impermeability and co-vulcanizability of brominated butyl rubber render it suitable for use in such tire innerliners. Other known uses for halogenated butyl rubber include white sidewall compounds for tires, heat resistant tubes and bladders.

A deficiency of butyl and halobutyl rubber is its lack of green strength when alone. In addition, the elongation characteristics of the uncured compounds can be used as a valuation of green strength. Lack of green strength renders difficult the processing and molding of rubber compounds based on butyl rubber. Green strength, viscosity and elastic memory are important properties influencing the processability of polymers and compounds in various end-use applications, e.g., tire fabrication. For example, in the manufacture of tire liners, very thin sheets of butyl rubber compound have to be prepared, applied to the green tire carcass and then cured. If the butyl or halobutyl rubber compound is deficient in green strength, there is risk of rupturing the thin sheets during processing unless very careful handling thereof is undertaken.

U.S. Pat. No. 4,256,857 discloses the improvement of green strength by treating the brominated butyl rubber with relatively small amounts of certain organic amine compounds. Examples of suitable amine compounds include N,N-dimethyl hexylamine, N,N-dimethyldodecylamine, N,N-dimethyloctadecylamine, N,N-diethyldecylamine and N,N-dimethylbenzylamine. These amine compounds have been found to provide green strength and allow the retention of good processing properties. While other amine compounds may be reacted with brominated butyl rubber to improve the strength of the rubber compound they generally also cause the rubber compound to be of inferior processing properties. In either case, heating and time requirements that are not efficient or practical for quick application for compounding in industrial applications.

U.S. Pat. No. 5,162,409 to Morocskowski describes a rubber blend suitable for use in automobile tire treads wherein the blend comprises a halogenated isobutylene rubber which can be the sole rubber of the blend or one of a combination of rubbers. A preferred embodiment comprises a rubber component comprising 20 to 60 wt % styrene/butadiene rubber, 20 to 60 wt % butadiene rubber, and 10 to 30 wt % of a halogenated rubber, a silica filler, and an organosilane cross-linking agent. It is disclosed that in a preferred embodiment, the rubber blends comprise 10 to 30 parts per 100 parts rubber (phr) of untreated, precipitated silica employed with an effective amount of organosilane coupling agent, for example, 1 to 8 phr. However, the green strength properties of the isobutylene rubber or blends thereof are not significantly improved.

The prior art has not addressed the full complement of green strength properties. In particular, what is needed is a blend that has improved relaxation and other properties to allow the blend to be processed at elevated temperatures, for example, at around 50° C., or from about 40 to 70° C. The present invention provides for a novel blend which addresses the present need for improved green strength while maintaining adequate impermeability.

SUMMARY OF THE INVENTION

In accordance with the present invention, an embodiment is directed to a blend comprising an isobutylene-based polymer and a semi-crystalline copolymer (SCC) which improves green strength properties while maintaining the barrier and oxidative heat aging properties. The SCCs are generally semi-compatible with isobutylene-based polymers and have crystalline melting points below the temperatures used in the mixing and shaping operations. An embodiment is a barrier membrane having an isobutylene-based polymer and a SCC, the SCC being a semi-crystalline ethylene copolymer having a melting point of from 25° C. to 105° C. and a heat of fusion from 2 J/g to 120 J/g as determined by differential scanning calorimetry (DSC) in one embodiment, from 10 J/g to 90 J/g in another embodiment, and from 20 J/g to 80 J/g in yet another embodiment.

In accordance with another embodiment of the present invention, the blend is an isobutylene-based polymer and a SCC, the SCC being a semi-crystalline ethylene copolymer wherein the ethylene content is at least from 45 wt % by weight of the SCC. Generally, the SCC is a copolymer of ethylene derived units and alpha-olefin derived units, the alpha-olefin having from 4 to 16 carbon atoms in one embodiment. The crystallinity arises from the ethylene derived units.

In accordance with a further embodiment, a tire innerliner or innertube is a brominated butyl rubber polymer and a SCC, the SCC being a semi-crystalline ethylene copolymer blend wherein the semi-crystalline ethylene copolymer has a melting point by DSC of from 25° C. to 105° C. in one embodiment, from 25° C. to 90° C. in another embodiment, and from 35° C. to 80° C. in yet another embodiment, and an average ethylene content of at least 45 wt % in one embodiment, and at least 60 wt % in another embodiment, and at least 70 wt % in yet another embodiment, the wt % relative to the total weight of the SCC.

DETAILED DESCRIPTION OF THE INVENTION

The present invention is a blend of an isobutylene-based elastomer (such as, for example, butyl rubber) and a semi-crystalline copolymer (SCC) that exhibits improved green strength, green elongation, and green relaxation properties. A further embodiment of the present invention is a blend of any isobutylene-based elastomer and SCC which exhibits improved aging properties and improved barrier properties. The improvement in green strength according to the invention is achieved without substantial sacrifice of any of the other desirable properties or processability of isobutylene-based elastomers and does not interfere with the subsequent curing operations conventionally conducted with isobutylene-based elastomers or the usefulness of the vulcanizates so obtained.

The Semi-Crystalline Copolymer

It was found that a class of preferably saturated (no backbone unsaturation), SCCs can be added to isobutylene-based polymers to improve green strength properties while maintaining the barrier and oxidative heat aging properties. These polymers are generally at least semi-compatible with isobutylene-based polymers and have crystalline melting points below the temperatures used in mixing and shaping operation. At handling and some further processing operations, such as tire building, done at temperatures below the crystalline melting point of the SCCs, the green properties are enhanced in blends of the present invention.

Generally, the SCC is a copolymer of ethylene derived units and alpha-olefin derived units, the alpha-olefin having from 4 to 16 carbon atoms in one embodiment, and in another embodiment the SCC is a copolymer of ethylene derived units and alpha-olefin derived units, the alpha-olefin having from 4 to 10 carbon atoms, wherein the SCC has some degree of crystallinity. In a further embodiment, the SCC is a copolymer of 1-butene derived units and another alpha-olefin derived unit, the other alpha-olefin having from 5 to 16 carbon atoms, wherein the SCC also has some degree of crystallinity. The SCC can also be a copolymer of ethylene and styrene.

More specifically, one embodiment of the SCC is a thermoplastic copolymer, s preferably random, of ethylene derived units an alpha-olefin derived units having from 4 to 16 carbon atoms, the SCC having a melting point by DSC analysis of from 25° C. to 105° C. in one embodiment, from 25° C. to 90° C. in another embodiment, and from 35° C. to 80° C. in yet another embodiment, and an average ethylene content by weight of from at least 45% in one embodiment, and from at least 60% in another embodiment, and from at least 70% in yet another embodiment, the wt % relative to the total weight of the SCC. The SCC preferably has a heat of fusion from 2 J/g to 120 J/g as determined by DSC (differential scanning calorimetry) in one embodiment, from 10 J/g to 90 J/g as determined by DSC in another embodiment, and from 20 J/g to 80 J/g in yet another embodiment.

The SCC of the polymer blends of the present invention is a crystallizable copolymer of ethylene (or 1-butene) derived units, and another alpha-olefin derived unit having from 4 to 16 carbon atoms in one embodiment, and from 4 to 10 carbon atoms in another embodiment. In one embodiment when ethylene is one copolymer, the alpha-olefin unit is derived from 1-butene, and 1-octene in yet another embodiment. The crystallinity of the SCC arises from crystallizable ethylene sequences. Blends, and the process for producing blends wherein ethylene and $C_4$ to $C_{16}$ alpha-olefins are used are more fully described in U.S. Pat. Nos. 5,272,236, 5,665,800, 5,783,638, 5,191,052, 5,382,630, 5,382,631, and 5,084,534. In yet another embodiment, the SCC is copolymer of 1-butene derived units and a $C_5$ to $C_{10}$ alpha-olefin derived units, the crystallizable units being derived from the 1-butene.

The SCC of the present invention preferably includes a random crystallizable copolymer having a narrow compositional distribution. The SCC is statistically random in the distribution of the ethylene and alpha-olefin comonomer sequences along the chain. There is substantially no statistically significant difference in the SCC, either among two polymer chains or along any one chain. Crystallization is measured by DSC, as described herein. In all SCC, the length and distribution of polyethylene sequences is consistent with the substantially random statistical crystallizable copolymerization.

The SCC desirably has a single broad melting transition as determined by DSC. Typically, a sample of the SCC will show secondary melting peaks adjacent to principal peak. These are considered together as single melting point and the highest of these peaks is considered the melting point. These SCC polymers have a melting point of less than 105° C. in one embodiment, less than 100° C. in another embodiment, and between 25° C. and 105° C. in another embodiment, and between 25° C. and 90° C. in yet another embodiment, and between 35° C. and 80° C. in yet another embodiment, and a heat of fusion of less than 120 J/g in one embodiment, less than 90 J/g in another embodiment, and less than 80 J/g in yet another embodiment, as determined by DSC.

The weight average molecular weight of the SCC can be between 10,000 to 5,000,000 in one embodiment, and from 80,000 to 500,000 in another embodiment, with a polydispersity index (PDI) between 1.5 to 40.0 in one embodiment, between 1.8 to 5 in another embodiment, and between 1.8 to 3 in yet another embodiment. It is desirable that the SCC have a Melt Index (MI) that is at a level of greater than 1, so long as the crystallinity of the SCC is within the ranges stated above. The MI can be between 0.1 and 5000 in one embodiment, greater than 35 in another embodiment, greater than 100 in yet another embodiment, between 0.1 and 1000 in yet another embodiment, and between 0.5 and 100 in yet another embodiment as measured by ASTM D1238.

The semi-crystalline nature, or diminished level of crystallinity, in the SCC of the invention relative to a crystalline homopolymer of ethylene derived units, is obtained by incorporating from 5 to 55 wt % by weight alpha-olefin in one embodiment, from 6 to 40 wt % by weight alpha-olefin in another embodiment, and from 8 to 30 wt % by weight alpha-olefin derived units in yet another embodiment into the copolymer, the wt % relative to the total weight of the SCC. The alpha-olefins comprise one or more members of the group $C_2$, $C_4$–$C_{16}$ alpha-olefins, and styrenes in one embodiment. As discussed above, one desirable alpha-olefin is a $C_4$ (the EXACT™ 4033 plastomer, a $C_2$, $C_4$ copolymer, commercially available from ExxonMobil Chemical Company) and another is a $C_8$ (the EXACT™ 8201 plastomer, a $C_2$, $C_8$ copolymer, commercially available from ExxonMobil Chemical Company).

More than one SCC as defined in the present application may be used as the SCC component of the invention. The different SCCs may differ in their crystallinity so long as the crystallinity falls within the described ranges.

The semicrystalline polymer component may contain small quantities of at least one diene, desirably at least one of the dienes is a non-conjugated diene to aid in the vulcanization and other chemical modification when present. The amount of diene is limited to be no greater than 10 wt % and desirably no greater than 5 wt %. The diene may be selected from the group consisting of those that are used for the vulcanization of ethylene propylene rubbers and desirably ethylidene norbornene, vinyl norbornene, dicyclopentadiene, and 1,4-hexadiene (available from DuPont Chemicals).

Rubber Component

A second component of the blends of the invention is an isobutylene-based elastomeric copolymer or other rubber component. In one embodiment, isobutylene-based polymers are employed in the blend of the invention, while halogenated isobutylene-based polymers are employed in another embodiment of the blend, and brominated butyl rubber, including star branched butyl rubber, are employed in yet another embodiment of the blend of the invention. The aforementioned list of isobutylene-based polymers are available from ExxonMobil Chemical Co. (Houston, Tex.) and described in U.S. Pat. Nos. 2,631,984, 2,964,489, 3,099,644, and 5,021,509. The isobutylene-based polymer may be selected from the group consisting of butyl rubber, polyisobutylene, random copolymers of a $C_4$ to $C_7$ isomonoolefin and a para-alkylstyrene, such as EXXPRO™, available from ExxonMobil Chemical Co. and described in U.S. Pat. Nos. 5,162,445, 5,430,118, 5,426,167, 5,548,023, 5,548,029, and 5,654,379. However, the scope of the present invention is not limited to the aforementioned blends and may include any isobutylene-based elastomeric polymer.

Such other rubbers with which the brominated butyl of this invention may be blended include natural rubber, polyisobutylene rubber, ethylene co-polymers, such as ethylene cycloolefin and ethylene isobutylene copolymers, styrene-butadiene rubber, polybutadiene, polyisoprene and styrene-butadiene polymers and the lesser unsaturated rubbers such as ethylene-propylene-diene polymers (EPDM). EPDM is the ASTM designation for a terpolymer of ethylene, propylene and a non-conjugated diolefin. One embodiment of the EPDM terpolymer is VISTALON 2200™ grade, available from ExxonMobil Chemical Company. Additional acceptable polymers are described in U.S. Pat. Nos. 5,763,556 and 5,866,665.

An embodiment of the primary rubber component present is natural rubber. Natural rubbers are described in detail by Subramaniam in RUBBER TECHNOLOGY 179–208 (Van Nostrand Reinhold Co. Inc., Maurice Morton, ed. 1987). Desirable embodiments of the natural rubbers of the present invention are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Fillers

The blends of the present invention may have one or more filler components such as calcium carbonate, clay, silica, talc, titanium dioxide, and carbon black. In one embodiment, the filler is carbon black or modified carbon black. The filler is reinforcing grade carbon black present at a level of from 10 to 100 phr of the blend, more preferably from 30 to 80 phr. Useful grades of carbon black as described in RUBBER TECHNOLOGY 59–85 (Van Nostrand Reinhold Co. Inc., Maurice Morton, ed. 1987) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762.

Preparation of the Blend

The blends of the present invention typically have from 3 to 95 wt % of the SCC by weight of the blend in one embodiment, and from 5 to 30 wt % by weight of the blend in another embodiment. The components are blended by techniques known to those skilled in the art, and is not limited therein by the method of blending or mixing.

The following data demonstrates improvements in green properties with little consequence to barrier or cured properties for the inventive blends. Moreover, the data suggest that blending of low molecular weight SCC with isobutylene-based polymers may enable reduction in plasticizer levels, such as oil and STRUKTOL™ MS-40, (Struktol Chemicals, Akron, Ohio) to further reduce barrier disadvantages while maintaining good compound processability. Also, low molecular weight polyisobutylene polymer, i.e. polyisobutylene oil, can be used as a plasticizer in place of processing oils such as FLEXON™ 876 used in the present examples. Plasticizers are added for obtaining acceptable processing characteristics such as mixing, milling, calendering, extrusion and molding. When low molecular weight SCC are added they can also act as plasticizers while the crystallinity of the SCC maintains improved green properties even at lower molecular weight.

Suitable barrier membranes, such as tire innerliner and innertube blends, may be prepared by using conventional mixing techniques including, e.g., kneading, roller milling, extruder mixing, internal mixing (such as with a BANBURY™ mixer), etc. The sequence of mixing and temperatures employed are well known to the skilled rubber compounder, the objective being the dispersion of polymers, fillers, activators and curatives in the polymer matrix without excessive heat buildup. A useful mixing procedure utilizes a BANBURY™ mixer in which the polymeric components, fillers, and other resins, plasticizers, and oils are added and the blend mixed for the desired time to a particular temperature to achieve adequate dispersion of the ingredients. Alternatively, the polymers and a portion of the fillers (e.g., one-third to two-thirds) are mixed for a short time (e.g., 1 to 3 minutes) followed by the remainder of the fillers and oil. Mixing is continued for 5 to 10 minutes at high rotor speed during which time the mixed components reach a temperature of 150° C. Following cooling, the components are mixed in a second step on a rubber mill or in a BANBURY™ mixer during which the curing agent and optional accelerator are thoroughly and uniformly dispersed at a relatively low temperature, e.g., 80° to 105° C. Variations in mixing will be readily apparent to those skilled in the art and the present invention is not limited to any specific mixing procedure. The mixing is performed to disperse all components of the blend thoroughly and uniformly.

The improved green strength blend of the present invention can be compounded alone or blended with other rubbers and processed with the same ingredients and the same procedures as used with conventional brominated butyl rubber, i.e. with fillers such as carbon black, silica or clay, with plasticizers, extender oils, such as isobutylene oil, low molecular weight polybutenes, and tackifiers and with vulcanizing agents such as zinc oxide and/or sulfur with or without additional vulcanization accelerations. Such other rubbers with which the brominated butyl of this invention may be blended include natural rubber, polyisobutylene rubber, ethylene co-polymers, such as ethylene cycloolefin and ethylene isobutylene copolymers, styrene-butadiene rubber, polybutadiene, polyisoprene and styrene-butadiene polymers and the lesser unsaturated rubbers such as ethylene-propylene-diene polymers (EPDM). EPDM is the ASTM designation for a terpolymer of ethylene, propylene and a non-conjugated diolefin. An embodiment of an EPDM terpolymer is VISTALON 2200™ grade, (ExxonMobil Chemical Company, Houston, Tex.). Additional acceptable polymers are described in U.S. Pat. Nos. 5,763,556 and 5,866,665.

The improved green strength blend of the present invention, alone or blended with other rubbers, may be cured by reaction with curatives well known in the art; the amounts of such curatives being those conventionally used. Generally, polymer blends, e.g., those used to produce tires, are often crosslinked. It is known that the physical properties, performance characteristics, and durability of vulcanized rubber compounds are directly related to the number (crosslink density) and type of crosslinks formed during the vulcanization reaction. (See, e.g., W. F. Helt, B. H. To & W. W. Paris, *The Post Vulcanization Stabilization for NR*, RUBBER WORLD 18–23 (1991)) Generally, polymer blends may be crosslinked by adding curative molecules, for example sulfur, zinc, metals, radical initiators, etc. followed by heating. This method may be accelerated and is often used for the vulcanization of elastomer blends. The mechanism for accelerated vulcanization of natural rubber involves complex interactions between the curative, accelerator, activators and polymers. Ideally, the entire available curative is consumed in the formation of effective crosslinks that join together two polymer chains and enhance the overall strength of the polymer matrix. Numerous curatives are known in the art and include, but are not limited to, the following: zinc oxide, stearic acid, tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate (ERP 390), 2-(morpholinothio) benzothiazole (MBS or MOR), blends of 90% MOR and 10% MBTS (MOR 90), N-oxydiethylene thiocarbamyl-N-oxydiethylene sulfonamide (OTOS) zinc 2-ethyl hexanoate (ZEH); and MC sulfur. In addition, various vulcanization systems are known in the art. (For example, see *Formulation Design and Curing Characteristics of NBR Mixes for Seals*, RUBBER WORLD 25–30 (1993)). The amount of other compounding ingredients is within the ranges known in the art.

The following examples include data that illustrates the improvements found to green elongation, green strength and relaxation integrity in barrier membranes and blends in general, such as tire innerliner model compounds. The barrier membranes and blends produced with the aforementioned blends may be used in the manufacture of articles, such as curable articles and/or vulcanizates, such tire innerliners, tire innertubes, pharmaceutical stoppers, roof sheeting, belts, tubes, hoses, and so on. The barrier membrane may be used to prevent gas or fluid intrusion or leakage.

Test Methods

I. Green Strength/Stress Relaxation

The green strength tests follow the guidelines set by ASTM D412-87, and modified as described.

A. Sample preparation. Test pad samples are prepared from a 102×102×6.0 mm milled sample weighing approximately 85±5 grams. The uncured sample is placed between MYLAR™ sheets in a room temperature mold, noting the direction of the mill grain. The mold is loaded in a curing press set at approximately 100° C. and pressed for a total of approximately five minutes; two minutes at low pressure (approximately 7800 lbs.) and three minutes at high pressure (30,000 lbs.). The molded pad is then removed and allowed to sit at room temperature for at least approximately 24 hours before testing. The testing samples are cut in 12 mm wide×75-mm long samples without removing the MYLAR™ backing, with mill grain along the sample length.

B. Testing. The standard test temperature is preferably 23±2° C. (open laboratory atmosphere) or 50° C. Samples are tested using an Instron tester having the following settings:

Load Cell: 1000 Newtons
Pneumatic jaws: set at 30-psi air pressure
Crosshead speed: 127 mm/min
Chart Speed: 50 mm/min
Full Scale: 25 Newtons
Jaw separation: 25 mm The MYLAR™ backing is removed from each side of the sample, for example by using acetone. The sample thickness is measured and marked with a 25-mm benchmark. The ends of the sample are covered with MYLAR™ on each side to prevent adhesion to the jaws. The sample is placed in the jaws of the tester, aligning the benchmark with the top and bottom edges of the jaws. The sample is stretched 100% (from 25 to 50 mm jaw separation). The tensile force is monitored after deformation is stopped until the tensile force exceeds the point at which the force decays by 75% (to 25% of the value after the crosshead is stopped).

C. Calculations. Using sample dimensions (width and thickness) and force data, the following can be calculated:

(i) Green strength: stress at 100% (at the point the crosshead stopped).

$$N/mm^2 = Force\ (N)/(sample\ width\ (mm))(thickness\ (mm)).$$

(ii) Relaxation Time (t75): from the recorder chart compute the time it took for the stress (force) to decay by 75% (from its value when relaxation started to the point the stress decayed to 25% of this value). The time should be counted after the crosshead stopped (it should exclude the deformation time of 12 sec).

(iii) Test three (3) specimens for each compound. Report the median as green strength and time to 75% decay.

D. Normalization. Green strength and stress relaxation values obtained for various materials can be normalized against a given material. This is accomplished by dividing each resulting reference stress by the reference stress for the standard material. The normalization should be done for measurements using identical parameters. However, after normalization, materials measured with one or more changes in the test parameters can still be compared if the standard material is the same material and was measured with both sets of parameters. For example, if the extent of decay is 75% in one set of tests and 50% in another set, both sets can be normalized against the same standard which is itself measured under both conditions. Since decay follows an exponential form, a normalized relaxation time is not strongly dependent on the extent of decay.

Permeability was tested by the following method. Thin, vulcanized test specimens from the sample blends were mounted in diffusion cells and conditioned in an oil bath at 65° C. The time required for air to permeate through a given specimen is recorded to determine its air permeability. Test specimens were circular plates with 12.7-cm diameter and 0.38-mm thickness.

The procedure used in the present application for Differential Scanning Calorimetry (DSC) is described as follows. Preferably, 6 mg to 10 mg of pellets is placed in a Differential Scanning Calorimeter and cooled to −50° C. to −70° C. The sample is then heated at 20° C./min to attain a final temperature of 200° C. to 220° C. The thermal output is recorded as the area under the melting peak of the sample which is typically at a maximum peak at 30° C. to 175° C. and occurs between the temperatures of 0° C. and 200° C. The thermal output is measured in Joules as a measure of the heat of fusion. The melting point is recorded as the temperature of the greatest heat absorption within the range of melting temperature of the sample.

Further descriptions of the testing procedures are described in U.S. Pat. No. 5,071,913. Green strength, viscosity and elastic memory are important properties affecting the processability of polymers and compounds in various end-use applications, e.g., tire fabrication. Tire innerliner compounds, for example, require low elastic memory. It would be expected that this property would be enhanced by lower viscosity, but it must be balanced against the need to maintain acceptable green strength that directionally increases as viscosity increases. Lower viscosity polymers are also preferred for easier mixing and calendering.

EXAMPLES

A series of compounds were mixed in an internal mixer using a model formulation. The compounds were based on one bromobutyl rubber (Sample 1), or blends of the bromobutyl rubber with the SCC according to the present invention (Samples 3–6), or with natural rubber (Sample 2). The SCC was introduced at levels of either 10 or 20 phr (parts per hundred rubber), the NR was introduced at 20 phr (Sample 2) as shown in the Table 1. Oil (STRUCTOL™ 40 MS) was introduced at 5 phr and carbon black was introduced at 60 phr in Samples 1–6.

The cure system shown in the Table 1 was incorporated on a mill. Table 2 describes two embodiments of the SCC used in the Sample blends 3–6.

Green properties of the compounds without the cure system components were measured at room temperature and at 50° C. and shown in Table 3. It was found that for consistent results the samples for green properties testing had to be carefully calendered before molding. Samples were cut out of molded pads into strips of 2.5 inches (6.35 cm) long, 0.5 inch wide (1.27 cm) and 0.1 inch thick (0.254 cm), such that the length of the samples corresponded to the direction of the calendered sheet leaving the calender. In all tests the strips were clamped in a tensile tester such that the distance between the grips was 1 inch (2.54 cm). A green tensile test was also conducted at 50° C. as shown in Table 3. For the tensile tests the same sample and test configuration was used with the sample pulled to break at a rate of 10 inches per minute (25.4 cm/min). All tests were carried on in triplicates with the median value being the recorded one.

The results for room temperature green stress relaxation are expressed as the green strength in Table 3. The green strength may be defined as being the stress at the end of extension (100% extension) after extension at 5 inch/min (12.7 cm/min), and the time to relax the stress by 75% from the stress at the end of extension. The time was measured from the instant the extension was stopped. The green strength test at 50° C. uses similar parameters to the room temperature test. The parameters recorded for the 50° C. green tensile test were 100% modulus, and % elongation at break. The parameters were also reported as the median sample out of three runs. The results for green properties are given in Table 3 and for selected samples according to the present invention in the stress-time and stress-strain traces at 50° C. in Table 3.

For room temperature green strength it can be seen that all samples with SCC have higher green strength. Sample 1 representing the lowest commercially available molecular weight bromobutyl (commercially available as BR 2222, ExxonMobil Chemical Company, Houston Tex.) without a second polymer showed the fastest relaxation time. For the 50° C. green strength, the relative ranking is similar; the relaxation times are different between the Sample 1 and Samples 3–6 in that the values are less at 50° C. than at room temperature. This is an advantageous property for high temperature processing of the uncured blends to form such articles as tires, where the uncured blend must be stretched and deformed into the desired shape, then maintain that shape after a desirably short period of time. An increase in elongation to break at 50° C. is shown by all compounds containing 20 phr SCC. The higher elongation is important for maintaining material integrity when processing calendered sheets at higher temperature, such as between 40 and 70° C. The higher green strength also helps in handling by helping reducing deformation during processing.

Processability during mixing, milling and calendering (or other high temperature green compound shaping such as extrusion) was not adversely affected by the addition of the SCC blends as experienced during sample preparation for this example. This behavior can be demonstrated in capillary flow as shown in the Table 4. Capillary extrusion was conducted in a Monsanto Processability Tester (MPT) instrument commercially available from Alpha Technologies of Akron, Ohio, at 100° C. The lower die swell at high shear rates of the SCC blends vs. the 100% bromobutyl formulation indicate reduced elasticity in processing which is helpful in shaping operations, even when high shear viscosities are similar. Viscosities may be further reduced if the molecular weight of the SCC is lowered, or the MI is increased.

Cured physical properties shown in the Tables 5 show that the modulus and elongation at break are is not adversely affected upon addition of the SCC.

An important property for isobutylene-based polymers in gas containing applications is air impermeability. For example, barrier membranes, or innerliners in tires, and innertubes for tires and bicycles, must contain pressurized gas for extended periods of time, and thus must have a high degree of impermeability. The data in Table 5 establishes improved air permeability at 65° C. when blending isobutylene-based polymers with the SCC disclosed in this application as compared to natural rubber or amorphous polymers and blends thereof. Reducing oil levels can reduce permeability significantly, while an increase in carbon black level is only slightly advantageous. Since some low molecular weight (or high MI) semi crystalline polymers and copolymers can act as plasticizers, oil levels can be reduced to improve barrier properties without impacting processing operations. Thus, the blends of the present invention are useful for articles that require a low gas permeability such as inner tubes and inner liners for automobile tires, truck tires, and tubes for bicycles, motorcycles, and other applications.

Although the invention has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Components of the Sample Blends

| Component (phr) | 1 | 2 | 3 | 4 | 5 | 6 |
|---|---|---|---|---|---|---|
| BR 2222[1] | 100 | 80 | 90 | 80 | 90 | 80 |
| SMR 20, Natural Rubber | — | 20 | — | — | — | — |
| EXACTtm ™ 4033[2] | — | — | 10 | 20 | — | — |
| EXACT ™ 8201[3] | — | — | — | — | 10 | 20 |
| FLEXON ™ 876[4] | 10 | 10 | 10 | 10 | 10 | 10 |
| STRUCTOL ™ 40 MS | 5 | 5 | 5 | 5 | 5 | 5 |
| N660 Carbon Black | 60 | 60 | 60 | 60 | 60 | 60 |
| Resin SP 1068[5] | 4 | 4 | 4 | 4 | 4 | 4 |
| Stearic Acid | 2 | 2 | 2 | 2 | 2 | 2 |
| Maglite K (Mg) | 0.15 | 0.15 | 0.15 | 0.15 | 0.15 | 0.15 |
| Cure System | | | | | | |
| ZnO | 3 | 3 | 3 | 3 | 3 | 3 |
| S (sulfur) | 0.5 | 0.5 | 0.5 | 0.5 | 0.5 | 0.5 |
| MBTS[6] | 1.5 | 1.5 | 1.5 | 1.5 | 1.5 | 1.5 |

1. BR 2222 is brominated butyl rubber (ExxonMobil Chemical Company, Houston TX)
2. EXACT ™ 4033 is an ethylene-butene copolymer with 24 wt % 1-butene derived units (ExxonMobil Chemical Company, Houston TX)
3. EXACT ™ 8201 is an ethylene-octene copolymer with 28 w % 1-octene derived units (ExxonMobil Chemical Company, Houston TX)
4. FLEXON ™ 876 is a paraffinic oil (ExxonMobil Chemical Company, Houston TX)
5. Resin SP 1068 is a resin (a phenolic resin) (Schenectady Chemical Company, Schenectady NY)
6. MBTS is 2,2'-benzothiazyl disulfide (Bayer AG, under the trade name VULKACIT DM/C ™)

TABLE 2

Properties of the SCC Embodiments of the Invention

| Property | EXACT ™ 4033 | EXACT ™ 8201 |
|---|---|---|
| Crystallinity[1] | 18.80% | 21.40% |
| Tm[2] | 61 | 75 |
| Density | 0.88 | 0.88 |
| Melt Index[3] | 0.8 | 1.1 |

[1]Crystallinity is calculated based on the melting enthalpy of polyethylene crystals.
[2]Tm is the peak melting temperature by DSC.
[3]Melt Index is measured based on ASTM D1238.

TABLE 3

Green (pre-cured) properties of the Sample blends

| Property | 1 | 2 | 3 | 4 | 5 | 6 |
|---|---|---|---|---|---|---|
| At room temperature | | | | | | |
| Green strength (100%), MPa | 0.31 | 0.29 | 0.36 | 0.53 | 0.37 | 0.53 |
| Relaxation time (75%), min. | 2.99 | 4.2 | 3.68 | 10.65 | 3.51 | 11.8 |
| At 50° C. | | | | | | |
| Green Strength (100%), MPa | 0.1 | 0.1 | 0.11 | 0.18 | 0.12 | 0.18 |
| Relaxation time (75%), min. | 1.8 | 1.93 | 1.5 | 4.52 | 2.24 | 7.6 |
| Tensile Strength, 100% Mod, MPa | 0.219 | 0.21 | 0.224 | 0.326 | 0.257 | 0.346 |
| Elongation, % | 258 | 304 | 189 | 280 | 356 | 349 |

TABLE 4

Processing Properties of the Sample blends at 1000 1/s Shear Rate

| Property | 1 | 2 | 3 | 4 | 5 | 6 |
|---|---|---|---|---|---|---|
| Viscosity (KPa/s) | 0.458 | 0.398 | 0.497 | 0.533 | 0.472 | 0.479 |
| % Relaxed die swell | 39.1 | 33.7 | 33 | 31.5 | 36.4 | 33.7 |

TABLE 5

Cured Properties of the Sample Blends

| Property | 1 | 2 | 3 | 4 | 5 | 6 |
|---|---|---|---|---|---|---|
| Tensile, un-aged | | | | | | |
| 100% Mod, MPa | 1.3 | 1.4 | 1.5 | 1.9 | 1.6 | 1.9 |
| Tensile Strength, MPa | 10.3 | 10.7 | 8.9 | 9.6 | 9.4 | 9.3 |
| % Elongation | 687 | 627 | 634 | 633 | 645 | 661 |
| Tensile, aged | | | | | | |
| 100% Mod, MPa | 2 | 2 | 2.2 | 2.8 | 2.6 | 2.9 |
| Tensile Strength, MPa | 9.6 | 9.2 | 8.8 | 9.1 | 8.5 | 8.8 |
| % Elongation | 572 | 506 | 545 | 530 | 518 | 519 |
| Permeability | | | | | | |
| 65° C. air permeability, $cm^3$-cm/$cm^2$-sec-atm × $10^3$ | 2.77 | 4.77 | 3.81 | 3.89 | 3.00 | 3.70 |

We claim:

1. A blend comprising an isobutylene-based polymer and a semi-crystalline ethylene copolymer, the semi-crystalline ethylene copolymer having an ethylene derived content of at least 45 wt % based on the total weight of the semi-crystalline copolymer; and wherein the isobutylene-based polymer is selected from the group consisting of butyl rubber, polyisobutylene, random copolymers of a $C_4$ to $C_7$ isomonoolefin and a para-alkylstyrene, and blends thereof.

2. The blend of claim 1, wherein the semi-crystalline ethylene polymer has a melting point of from 25° C. to 105° C. and a heat of fusion from 2 J/g to 120 J/g as determined by DSC.

3. The blend of claim 1, wherein the semi-crystalline ethylene copolymer has a heat of fusion from 10 J/g to 90 J/g as determined by DSC.

4. The blend of claim 1, wherein the semi-crystalline ethylene copolymer has a heat of fusion from 20 J/g to 80 J/g as determined by DSC.

5. The blend of claim 1, wherein the semi-crystalline copolymer further comprises one or more dienes.

6. The blend of claim 5, wherein the diene is selected from the group comprising of ethylidene norbornene, vinyl norbornene, dicyclopentadiene and 1,4-hexadiene.

7. The blend of claim 1, comprising from 3 to 95 wt % semi-crystalline copolymer by weight of the blend.

8. The blend of claim 1, wherein the isobutylene-based polymer is halogenated.

9. The blend of claim 8, wherein the isobutylene-based polymer is brominated butyl rubber.

10. The blend of claim 8, wherein the isobutylene-based polymer is a halogen-containing random copolymer of a $C_4$ to $C_7$ isomonoolefin and a para-alkylstyrene.

11. The blend of claim 1, wherein the semi crystalline copolymer comprises a random copolymer.

12. The blend of claim 1, wherein the blend is cured and the cured blend possesses an air permeability from less than $5 \times 10^{-8}$ [$cm^3$-cm/$cm^2$-sec-atm] at 65° C.

13. The blend of claim 1, having a green strength in 0.1 MPa to 1 MPa at 100% modulus at 50° C.

14. The blend of claim 1, further comprising one or more of the following compounds selected from the group consisting of amorphous polymer, oil, low molecular weight polybutenes, antioxidants, stabilizers, fillers, pigments, carbon black, and mixtures thereof.

15. The blend of claim 1, wherein the blend is curable.

16. The blend of claim 1, wherein the blend is a vulcanizate.

17. The blend of claim 1, wherein the semi-crystalline copolymer is a random copolymer produced from:

a) ethylene monomers;

b) one or more other monomers selected from the group consisting of alpha-olefins having from 4 to 10 carbon atoms, styrenes; and c) optionally, one or more dienes.

18. An article of manufacture comprising the blend of claim 1.

19. A method for producing a polymer blend comprising mixing an isobutylene-based polymer with a semi-crystalline copolymer, the semi-crystalline polymer having an ethylene content of at least 45 wt % by weight of the semi-crystalline copolymer; and wherein the isobutylene-based polymer is selected from the group consisting of butyl rubber, polyisobutylene, random copolymers of a $C_4$ to $C_7$ isomonoolefin and a para-alkylstyrene, and blends thereof.

20. The method of claim 19, further comprising adding one or more of the following compounds selected from the group consisting of amorphous polymers, oils, low molecular weight polybutenes, antioxidants, stabilizers, fillers, pigments, carbon black, and mixtures thereof.

21. The method of claim 19, comprising from 3 to 95 wt % semi-crystalline copolymer by weight of the blend.

22. The method of claim 19, comprising from 5 to 30 wt % semi-crystalline copolymer by weight of the blend.

23. The blend of claim 1, wherein the blend is cured and the cured blend possesses an air permeability from less than $8 \times 10^{-8}$ [$cm^3$-$cm/cm^2$-sec-] at 65° C.

24. The method of claim 19, wherein the polymer blend is cured and the cured polymer blend possesses an air permeability from less than $8 \times 10^{-8}$ [$cm^3$-$cm/cm^2$-sec-atm] at 65° C.

* * * * *